United States Patent
Scalora et al.

(10) Patent No.: US 7,246,361 B1
(45) Date of Patent: Jul. 17, 2007

(54) SUPPORTING MULTIPLE LATE BINDING OBJECTS WITH THE SAME IDENTIFIER

(75) Inventors: Michael Scalora, Orem, UT (US); Steven Smith, San Jose, CA (US); Harold R. Davidson, American Fork, UT (US)

(73) Assignee: Intuit, Inc., Mountain View, CA (US)

( * ) Notice: Subject to any disclaimer, the term of this patent is extended or adjusted under 35 U.S.C. 154(b) by 907 days.

(21) Appl. No.: 10/394,384

(22) Filed: Mar. 20, 2003

(51) Int. Cl.
*G06F 13/00* (2006.01)

(52) U.S. Cl. .................................. 719/332; 719/331

(58) Field of Classification Search ............... 719/331, 719/332
See application file for complete search history.

(56) References Cited

U.S. PATENT DOCUMENTS 6,684,259 B1 * 1/2004 Discavage et al. .......... 719/316
6,697,877 B1 * 2/2004 Martin et al. ............... 719/315
2003/0005169 A1 * 1/2003 Perks et al. ................. 709/315

* cited by examiner

*Primary Examiner*—William Thomson
*Assistant Examiner*—Andy Ho
(74) *Attorney, Agent, or Firm*—Park, Vaughan & Fleming, LLP (57) ABSTRACT

Support is provided for multiple late binding objects with a same identifier, in an operating environment that only supports registration of a single late binding object with the same identifier. Each of a plurality of processes is associated with one of a plurality of late binding objects, such that at least two processes are each associated with a separate late binding object having the same identifier. Responsive to one of the plurality of processes attempting to access a late binding object by its identifier, a determination is made as to which late binding object is associated with the process. The associated late binding object is made available to the process.

29 Claims, 10 Drawing Sheets

SUPPORTING MULTIPLE LATE BINDING OBJECTS WITH THE SAME IDENTIFIER

BACKGROUND

1. Field of Invention

The present invention relates generally to late binding software objects, and specifically to supporting multiple late binding objects with a same identifier in an operating environment that only supports registration of a single late binding object for each identifier.

2. Background of Invention

Contemporary software development often utilizes late binding. In late binding, external code is associated with a program at run time rather than at compile time. Therefore, late binding allows software developers to change functionality associated with a computer program, without having to change or even have access to the source code.

For example, suppose an accounting software program includes calls to a capital gains object, which contains code to categorize capital gains, and to calculate capital gains tax. Without late binding, in order to change the capital gains object to take advantage of a more robust calculating algorithm, or to reflect changes in the tax law, the software developer would be required to edit the source code of the accounting program, recompile the source code, relink the object code, and distribute a new executable image to all users of the software.

This problem can be solved by making the capital gains object a late binding object, external to the accounting program itself. That way, the accounting software could be programmed such that all calls to the capital gains object will execute code to determine which late binding object is associated with the call, and then to access that object. Therefore, in order to update the capital gains functionality, the developer would need only to modify the capital gains object itself, and to make the new capital gains object available to users of the accounting software. This eliminates the need to edit and recompile the source code for the accounting program. All calls within the unmodified accounting program would then be automatically associated with the updated capital gains object.

One example of late binding is the use of Component Object Module (COM) objects in Microsoft Windows®. COM objects are late binding objects that are programmed according to a published Microsoft standard. The use of COM objects is very widespread within Windows programming. A developer can register a COM object having a specific identifier with the Windows operating system. Other Windows programs can then call the registered COM object through the operating system, by using the identifier. Both Microsoft and other providers of Windows software frequently use COM objects to provide late binding functionality.

One problem with COM objects is that Windows requires each identifier to be uniquely associated with a single COM object. As a result, multiple COM objects cannot be associated with the same identifier. In other words, there is no mechanism within the Windows operating system for associating different programs with different COM objects having the same identifier. All programs that call a COM object with a specific identifier must access the same COM object. If the COM object is updated, all programs will automatically access the updated version.

This can be problematic, because it is often desirable to have multiple versions of a software program installed on the same computer, and these multiple versions might need to access different versions of a given late binding object, such as a COM object. For example, suppose a new version of an accounting program is released, and it uses an updated capital gains object, having the same identifier as the older capital gains object in the previous version of the software. A user might wish to install the updated version of the accounting software on his computer, but at the same time keep the earlier version installed. This could be the case, for example, if the user wanted to test the new version before deleting the old version. Additionally, a user might need to utilize different versions of the accounting program for different purposes, such as personal, business, domestic and foreign accounting. However, because Windows only supports registration of a single COM object for each identifier, for all programs running under the operating system, different versions of the accounting software would not each be able to access separate capital gains objects with this same identifier. Instead, all versions would have to access the same capital gains object. This problem is not limited to Windows and COM objects, but exists wherever an operating system or other type of operating environment (e.g., a middleware environment such as CORBA or SOM) only supports the use of a single late binding object with the same identifier.

This could be prevented by using new late binding object identifiers in each version of the accounting software, but that would require that all calls to all late binding objects be changed in the source code, thereby eliminating the ability to update functionality without recompiling source code of the underlying application, which is a primary advantage of late binding.

Another option would be to make all versions of the software compatible with the same late binding objects, but this would severely limit the ability of developers to introduce varied functionality across software releases. Furthermore, such a requirement would make software testing difficult and expensive.

Another solution would be to require to no more than one version of a software program be installed on a user's machine at any one time, but this is unacceptable from a marketing standpoint to many software vendors.

What is needed is a method, a computer program product and a system that allow using multiple late binding objects with the same identifier in an operating environment that that only supports registration of a single late binding object with the same identifier.

SUMMARY OF INVENTION

In an operating environment that only supports a single late binding object with a given identifier, support is provided for multiple late binding objects with the same identifier. At least two processes are associated with separate late binding objects having the same identifier. Responsive to a process attempting to access a late binding object by its identifier, it is determined which late binding object with that identifier is associated with the process. The associated late binding object is then made available to the process.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
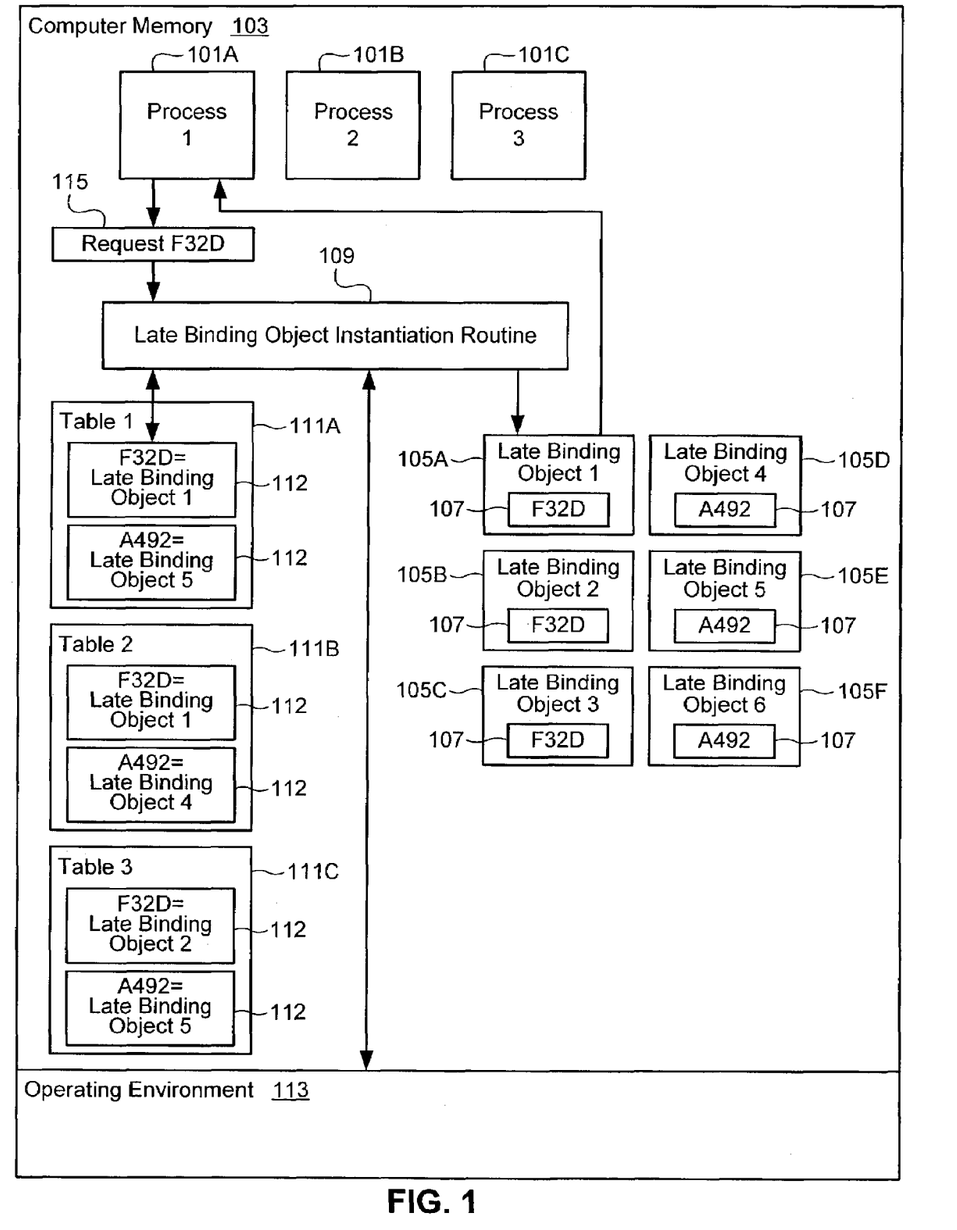
FIG. 1 is a block diagram, illustrating an overview of one embodiment of the present invention.

FIG. 1 illustrates an overview of a computer system configured in accordance with one embodiment of the present invention. Three processes 101 are resident in computer memory 103. Although three processes 101 are illustrated as an example, it is to be understood that any plural number of processes 101 can operate in conjunction with the present invention.

Also present are six late binding objects 105 (A–F), each with an identifier 107. FIG. 1 illustrates three late binding objects 105 (A–C) with the same identifier of "F32D," and three late binding objects 105 (D–F) with the same identifier of "A492." More or fewer late binding objects 105 can have the same identifier 107, or different identifiers 107 as desired. "F32D" and "A492" are both four digit hexadecimal numbers, which is, of course, only an example of a format for a late binding object 105 identifier 107. Numerous other possible formats will be readily apparent to one of ordinary skill in the relevant art.

Six late binding objects 105 are illustrated, but this number is only an example. Fewer or more late binding objects 105 can be utilized, as desired. Furthermore, it will be readily apparent to those of ordinary skill in the relevant art that late binding objects 105 can reside in dynamic computer memory 101 or static computer memory 101 as desired. As those of ordinary skill in the relevant art will readily understand, late binding objects 105 can but need not be components of dynamic link libraries (DLLs), and can be stored in DLL files on static media. Of course, Microsoft COM objects are one example of a type of late binding object 105 that can be used with the present invention.

FIG. 1 also illustrates a late binding object instantiation routine 109 in computer memory 103. As illustrated, the late binding object instantiation routine 109 is not a part of the operating environment 113, but is instead a software component that is executed in computer memory 103 in conjunction with some embodiments of the present invention. However, in at least some embodiments the late binding object instantiation routine 109 or its equivalent functionality can be made part of the operating environment 113. In some embodiments, processes 101 call the late binding object instantiation routine 109 in order to access late binding objects 105. In other embodiments, processes 101 access late binding objects 105 in other ways. The late binding object instantiation routine 109 and alternatives thereto are explained in greater detail later in this specification.

In the embodiment illustrated by FIG. 1, each process 101 has a corresponding object table 111, which maps identifiers 107 to specific late binding objects 105. An object table 111 associated with a process 101 includes, for each late binding object 105 associated with the process 101, enough information 112 to access that specific late binding object 105 by its identifier 107. Thus, the object tables 111 enable many different processes 101 to access associated late binding objects 105 by their identifiers 107 in a system where multiple late binding objects 105 can have the same identifier 107.

In the example illustrated by FIG. 1, Table 111A corresponds to Process 101A, Table 111B to Process 101B and Table 111C to Process 101C. As illustrated, Table 1 111A maps the identifier "F32D" to Late Binding Object 105A, and the identifier "A492" to Late Binding Object 105E. Thus, for Process 101A, these identifiers 107 are associated with these late binding objects 105. Tables 111B and 111C map the same identifiers 107 to specific late binding objects 105 for Processes 101B and 101C respectively. As illustrated, the identifier "F32D" is associated with Late Binding Object 105A for Process 101B, and with Late Binding Object 105B for Process 101C, whereas the identifier "A492" is associated with Late Binding Object 105D for Process 101B, and with Late Binding Object 105 E for Process 101C.

The creation and specific format of object tables 111 are explained in greater detail later in this specification. In other embodiments of the present invention, the association between a process 101 and its corresponding late binding objects 105 is implemented in ways other than an object table 111, as further explained in due course.

As illustrated by FIG. 1, in one embodiment of the invention, processes 101 attempt to access late binding objects 105 by calling the late binding object instantiation routine 109, and passing it a request 115 to access a late binding object 105 by its identifier 107. In the illustrated example, Process 101A calls the late binding object routine 109, and passes it 109 a request 115 to access the late binding object 105 with the identifier 107 "F32D."

It is to be understood that in the prior art, processes 101 would typically call the operating environment 113 to access late binding objects 105. In this illustrated embodiment of the present invention, processes 101 call the late binding object instantiation routine 109 instead of the operating environment 113 to access late binding objects 105. The implementation mechanisms for calling the late binding object instantiation routine 109 will be readily apparent to one of ordinary skill in the art.

The late binding object instantiation routine 109 can use standard operating environment 113 services to determine which process 101 attempted to access the late binding object 105. For example, the late binding object instantiation routine 109 can call the operating system to determine which process 101 is active. The exact protocol for using standard operating environment 113 services to determine which process 101 attempted to access the late binding object 105 will vary based upon the operating environment 113 in use, and will be readily apparent to ordinarily skilled artisans.

Responsive to the request 115 to access a late binding object 105, the late binding object instantiation routine 109 determines which late binding object 105 with the requested identifier 107 is associated with the calling process 101. In some embodiments, the late binding object instantiation routine 109 determines which late binding object 105 is associated with the process 101 by reading the associated object table 111 associated with the calling process 101, as illustrated in FIG. 1. In the illustrated example, the late binding object instantiation routine 109 reads Object Table 111A (which is associated with Process 101A), and determines that, for Process 101A, Late Binding Object 105A is associated with the identifier "F32D."

The late binding object instantiation routine 109 can use various methodologies that will be readily apparent to those of ordinary skill in the relevant art to locate the object table 111 that is associated with the calling process 101. For example, the object table 111 could have a name that is associated with the process 101, or could reside in a directory or folder at a location relative to that of the executable image for the process 101. In other embodiments, the late binding object instantiation routine 109 determines which late binding object 105 with the requested identifier 107 is associated with the process 101 in other ways, which are explained later in this specification.

As illustrated in FIG. 1, the late binding object instantiation routine 109 makes the late binding object 105 available to the calling process 101. Making the late binding object 105 available to the calling process 101 is discussed in greater detail below.

Figure 2:
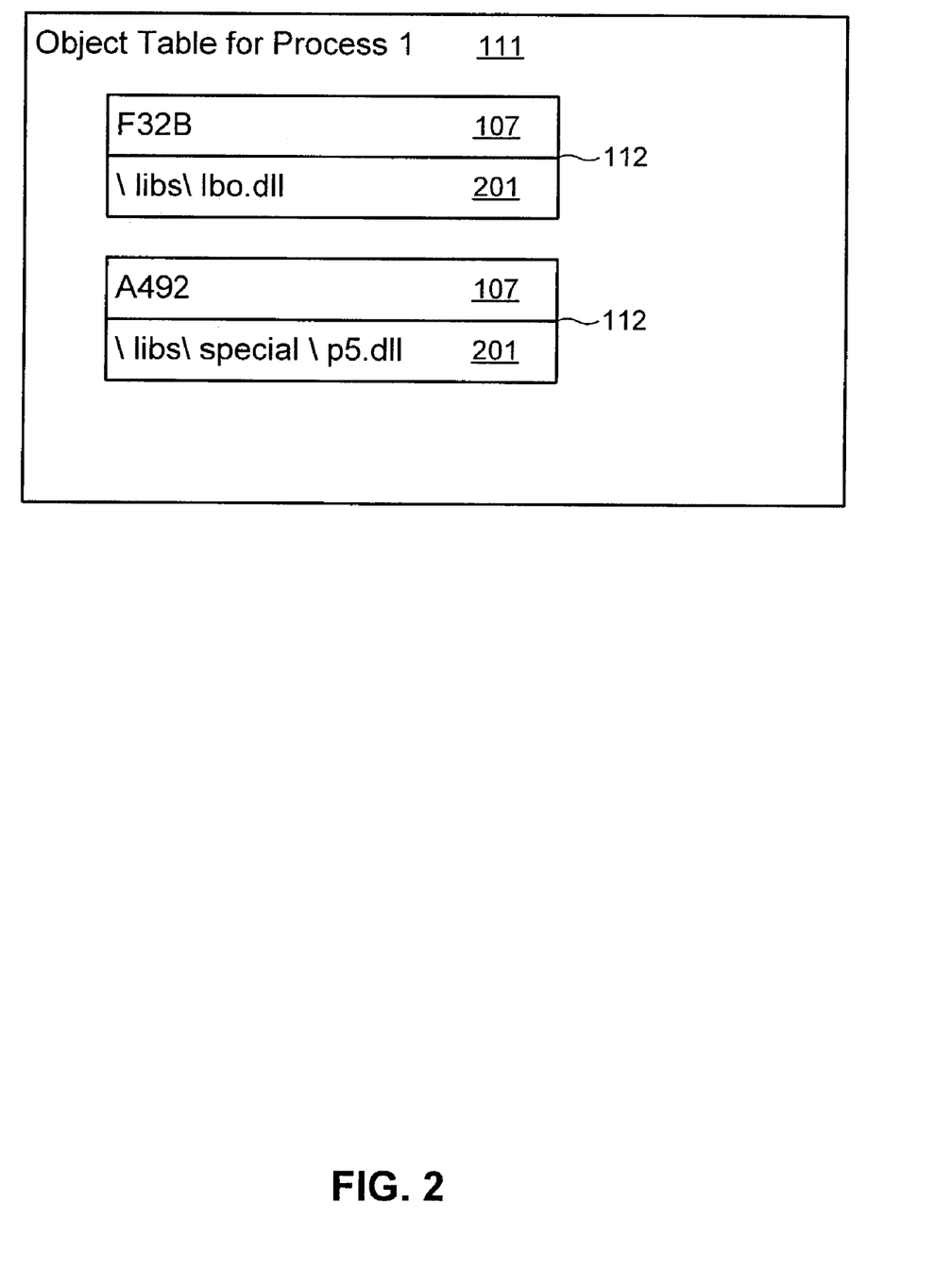
FIG. 2 is a block diagram, illustrating an object table associated a specific process, according to one embodiment of the present invention.

FIG. 2 illustrates an object table 111 associated with an individual process 101, according to some embodiments of the present invention. As explained above, an object table 111 includes information 112 to access relevant late binding objects 105 by their identifiers 107. As illustrated in FIG. 2, this information can comprise an identifier 107 and a location 201 of each late binding object 105.

FIG. 2 shows an object table 111 that is associated with Process 101A. Two late binding objects 105 are associated with Process 101A. The first late binding object has an identifier 107 of "F32B," and a location 201 of "\libs\lbo.dll." It will be understood that this exemplar location comprises a relative reference from the location of the executable image for Process 101A to the location of the late binding object 105 associated with Process 101A with the identifier "F32B." The second late binding object associated with Process 101A has an identifier 107 of "A492" and a location 201 of "\libs\special\p5.dll." Of course, the information 112 can be of other forms and/or formats (e.g. an absolute location 201 of the late binding object 105, an offset from a fixed position in dynamic memory, etc.). The specific format of an object table 111 is a design consideration. Various possibilities will be readily apparent to those of skill in the art. It is to be understood that a software developer, vendor, publisher or the like can associate processes 101 with desired late binding objects 105 by creating associated object tables 111.

Figure 3:
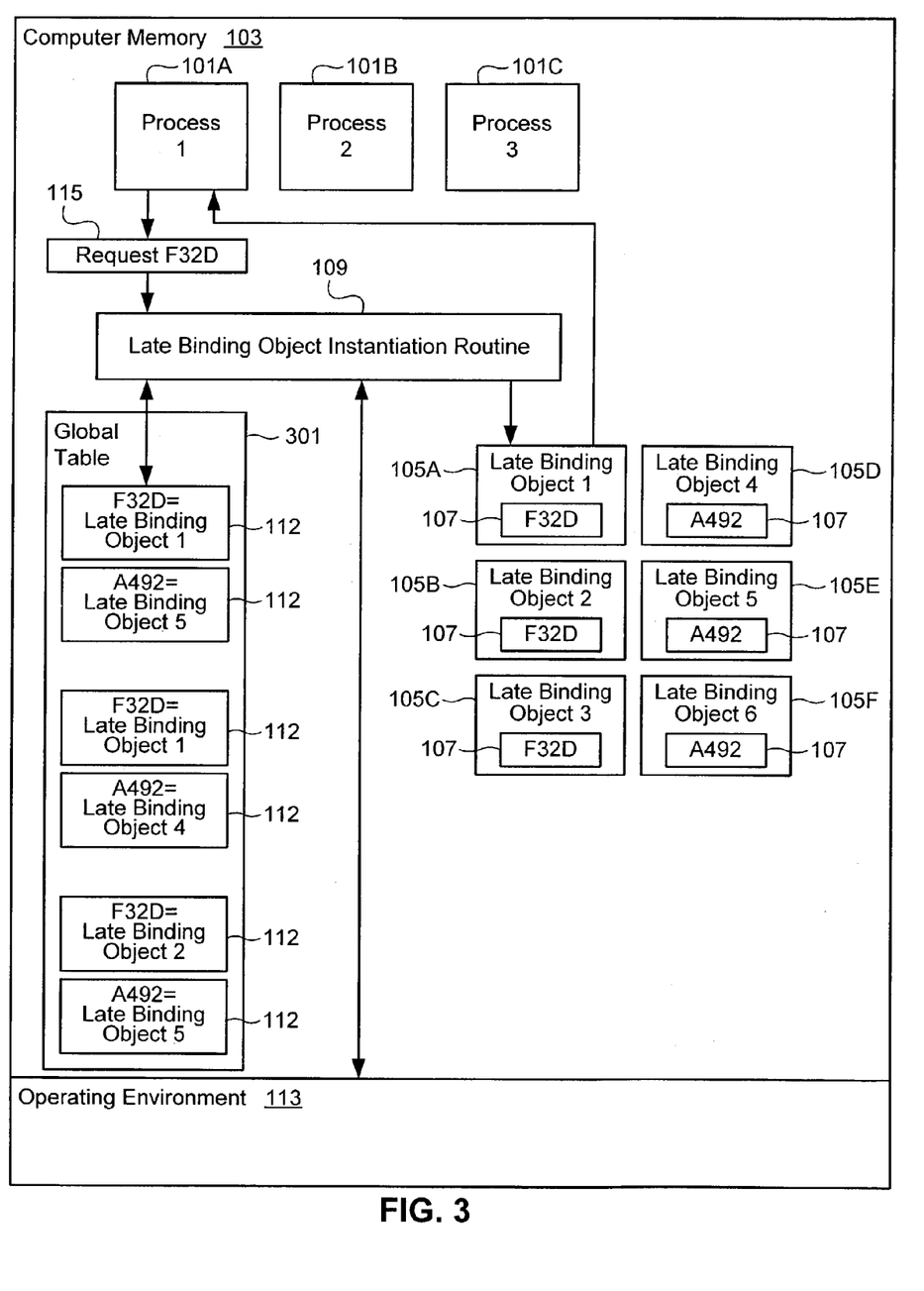
FIG. 3 is a block diagram, illustrating an overview of an embodiment of the present invention that utilizes a global object table.

FIG. 3 illustrates another embodiment in which processes 101 are associated with late binding objects 105 by a single, global object table 301, as opposed to a separate object table 111 for each process 101. The global object table maps identifiers 107 to specific late binding objects 105 for each supported process 101. Thus, rather than including late binding object 105 access information 112 for the late binding objects 105 associated with a specific process 101, the global object table includes access information 112 for the late binding objects 105 associated with each process 101 of the plurality. In the embodiment illustrated by FIG. 3, the late binding object routine 109 determines which late binding object 105 with a requested identifier 107 is associated with a calling process 101 by reading the global object table 301.

It will be readily apparent to those of ordinary skill in the relevant art that the access information 112 in a global object table 301 would include sufficient information for the late binding object instantiation routine 109 to access a late binding object 105 associated with a calling process 101, based on a late binding object 105 identifier 107. Various specific formats are possible, all of which are within the scope of the present invention.

Figure 4:
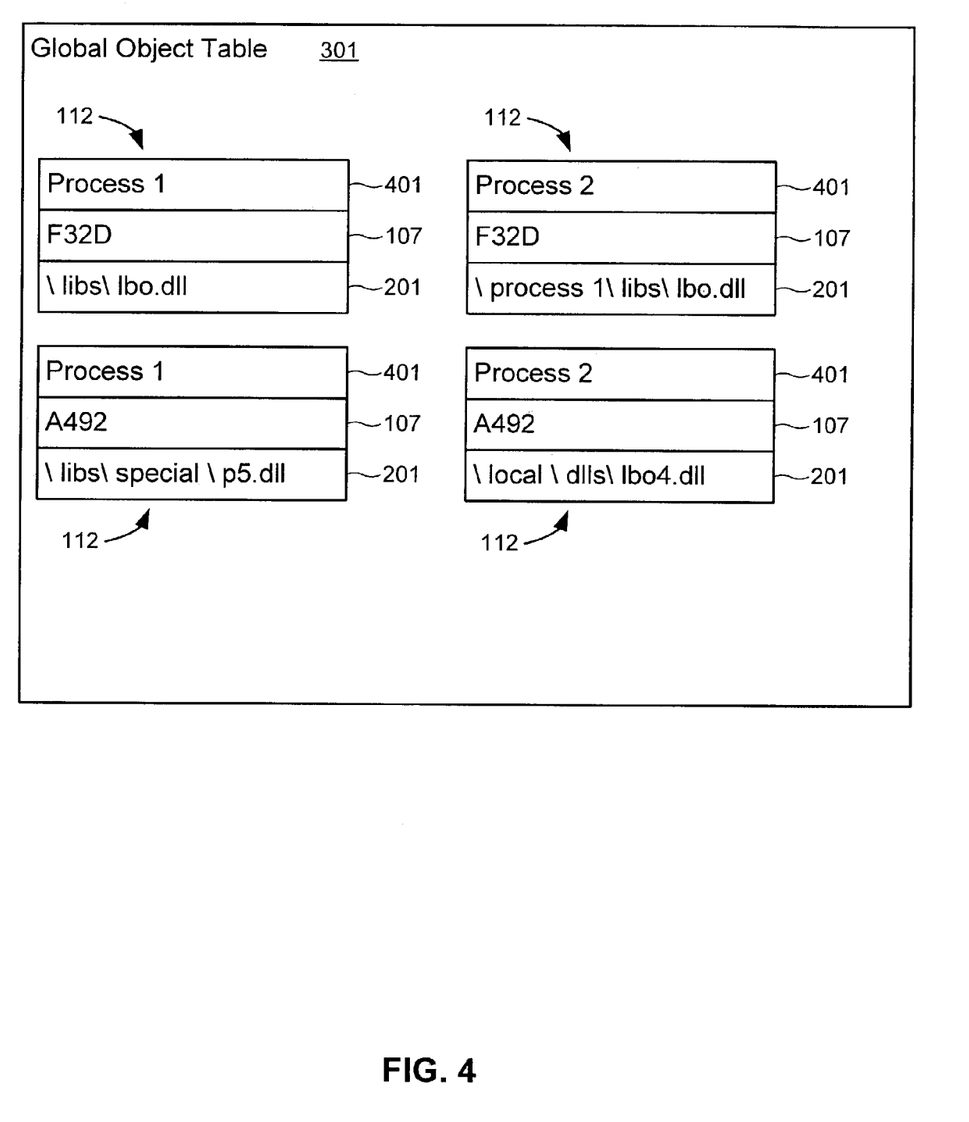
FIG. 4 is a block diagram, illustrating a global object table, according to one embodiment of the present invention.

FIG. 4 illustrates an example of a format for a global object table 301. In the illustrated example, the table contains access information 112 indicating the process name 401, identifier 107 and location 201 (in the form of a relative reference) for each late binding object 105 associated with each process 101 (in FIG. 4, only two processes 101 are illustrated).

Figure 5:
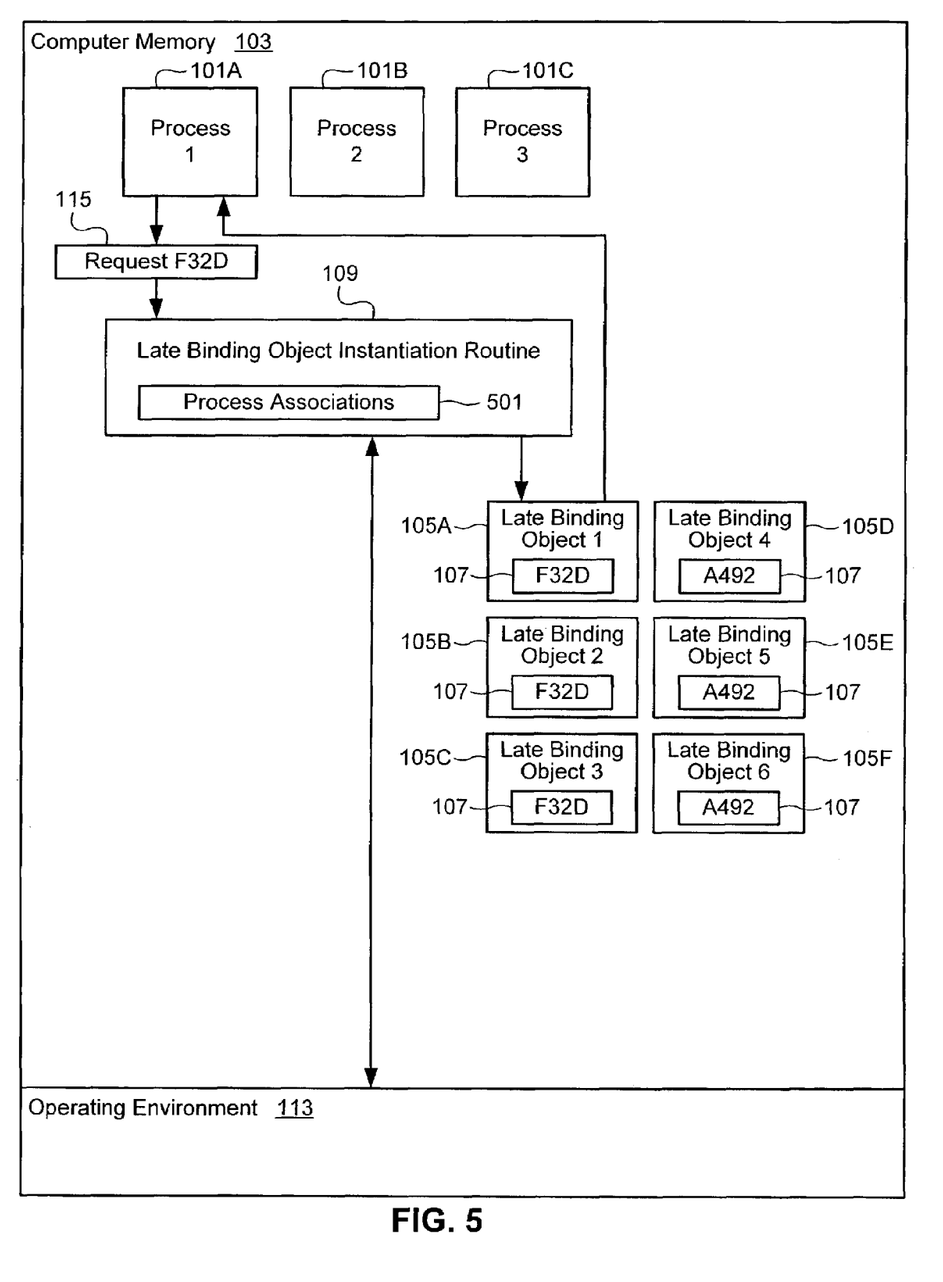
FIG. 5 is a block diagram, illustrating an overview of another embodiment of the present invention, in which process associations are maintained by a late binding object instantiation routine.

FIG. 5 illustrates an embodiment in which processes 101 are associated with late binding objects 105 by the late binding object instantiation routine 109 itself, as opposed to an external object table 111. In this embodiment, the late binding object instantiation routine 109 contains process associations 501 for each process 101. A process association 501 associates a given process 101 with a late binding object 105. When a process 101 passes the late binding object instantiation routine 109 a request 115 to access a late binding object 105 by its identifier 107, the routine 109 determines which late binding object 105 to make available by reading its internal process associations 501. As with object tables 111, the specific format of the process associations 501 is a design variable.

Figure 6:
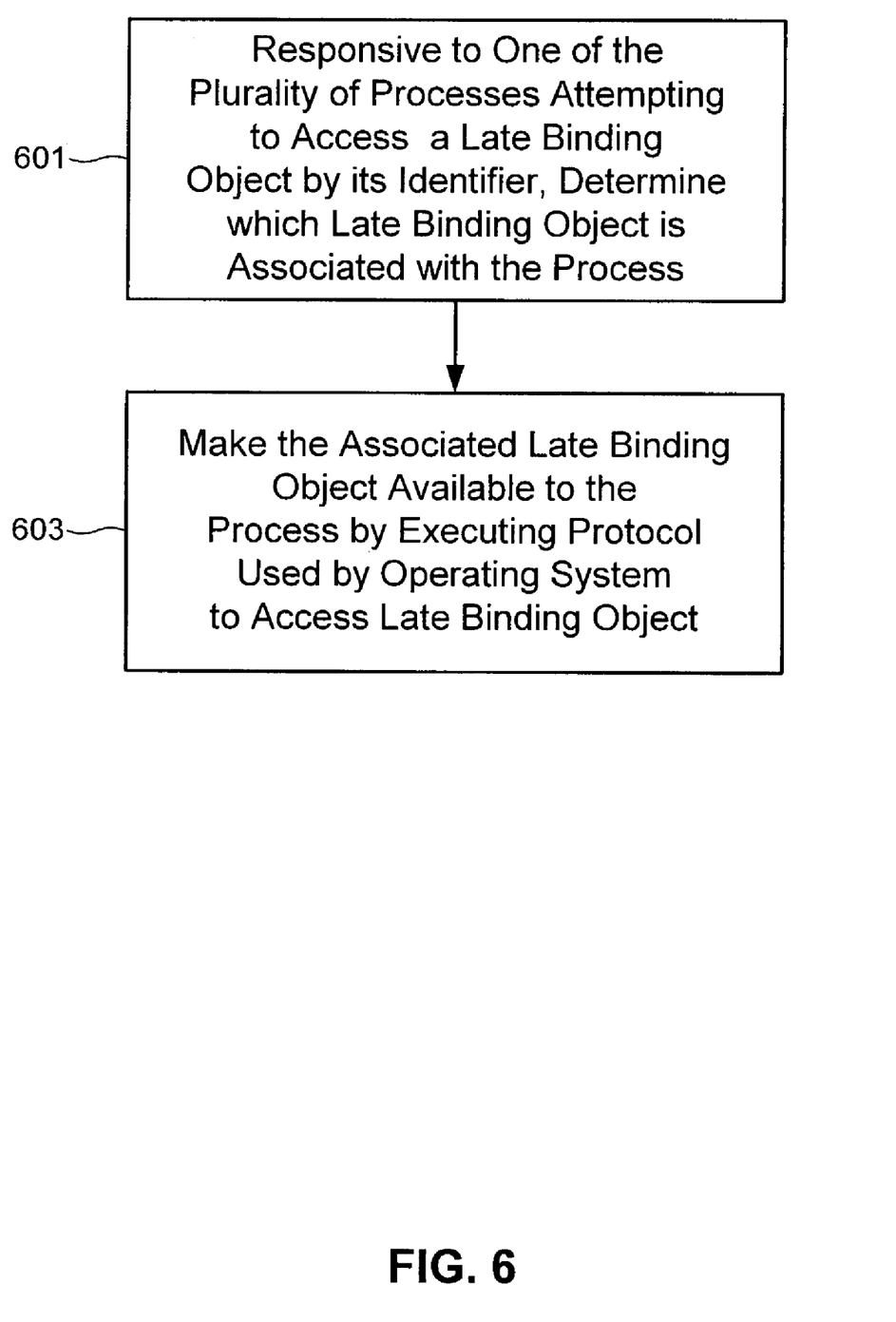
FIG. 6 is a flowchart illustrating steps for making a late binding object available to a requesting process, according to some embodiments of the present invention.

FIG. 6 illustrates steps for making an associated late binding object 105 available to a process 101, according to various embodiments of the present invention. As per FIG. 6, responsive to one of the processes 101 attempting to access a late binding object 105 by its identifier 107, a late binding object instantiation routine 109 determines 601 which late binding object 105 is associated with the process 101. This determination can be made any of the ways described within this specification. Then, in order to make the late binding object 105 available to the calling process 101, the late binding object instantiation routine 109 executes 603 a protocol used by the operating environment 113 in order to access the late binding object 105. It is to be understood that the specific protocol to execute 603 will vary depending upon the operating environment 113 in use and the type of late binding object 105 being accessed. The protocol used to access late binding objects 105 of a specific type under a specific operating environment 113 will be known to those of skill in the art. For example, the protocol for accessing COM objects under Microsoft Windows® is published by Microsoft, and is known by computer programmers who do work in the relevant technical area.

Figure 7:
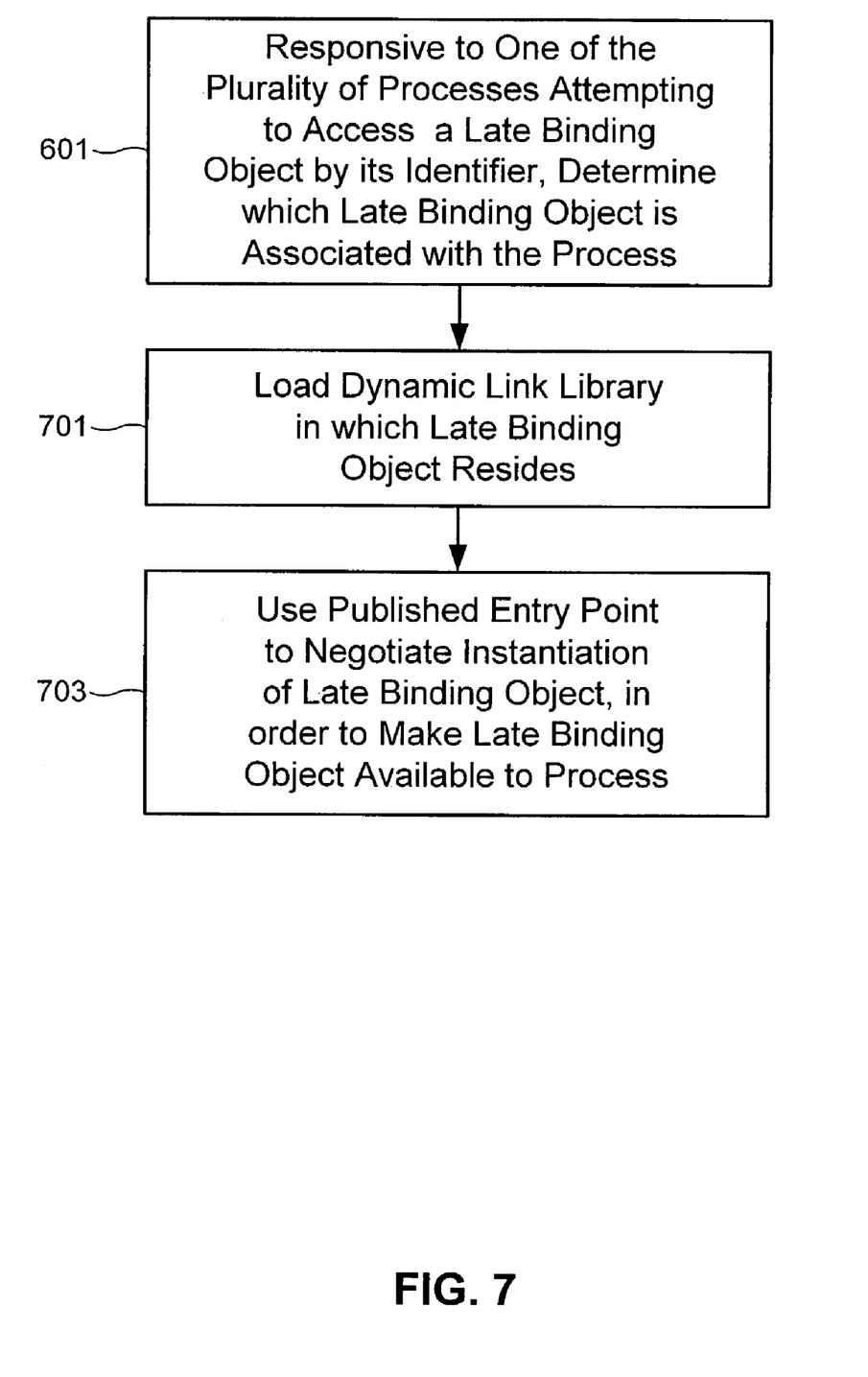
FIG. 7 is a flowchart, further illustrating steps for making a late binding object available to a requesting process, according to some embodiments of the present invention.

FIG. 7 illustrates a specific example of executing a protocol for making an associated late binding object 105 available to a process 101, according to an embodiment of the present invention. Responsive to one of the plurality of processes 101 attempting to access a late binding object 105 by its identifier 107, a late binding object instantiation routine 109 determines 601 which late binding object 105 is associated with the process 101. Then, the late binding object instantiation routine 109 loads 701 a dynamic link library in which the late binding object 105 resides. In order to make the late binding object 105 available to the calling process 101, the late binding object instantiation routine 109 uses 703 a published entry point to negotiate instantiation of the late binding object 105.

Figure 8:
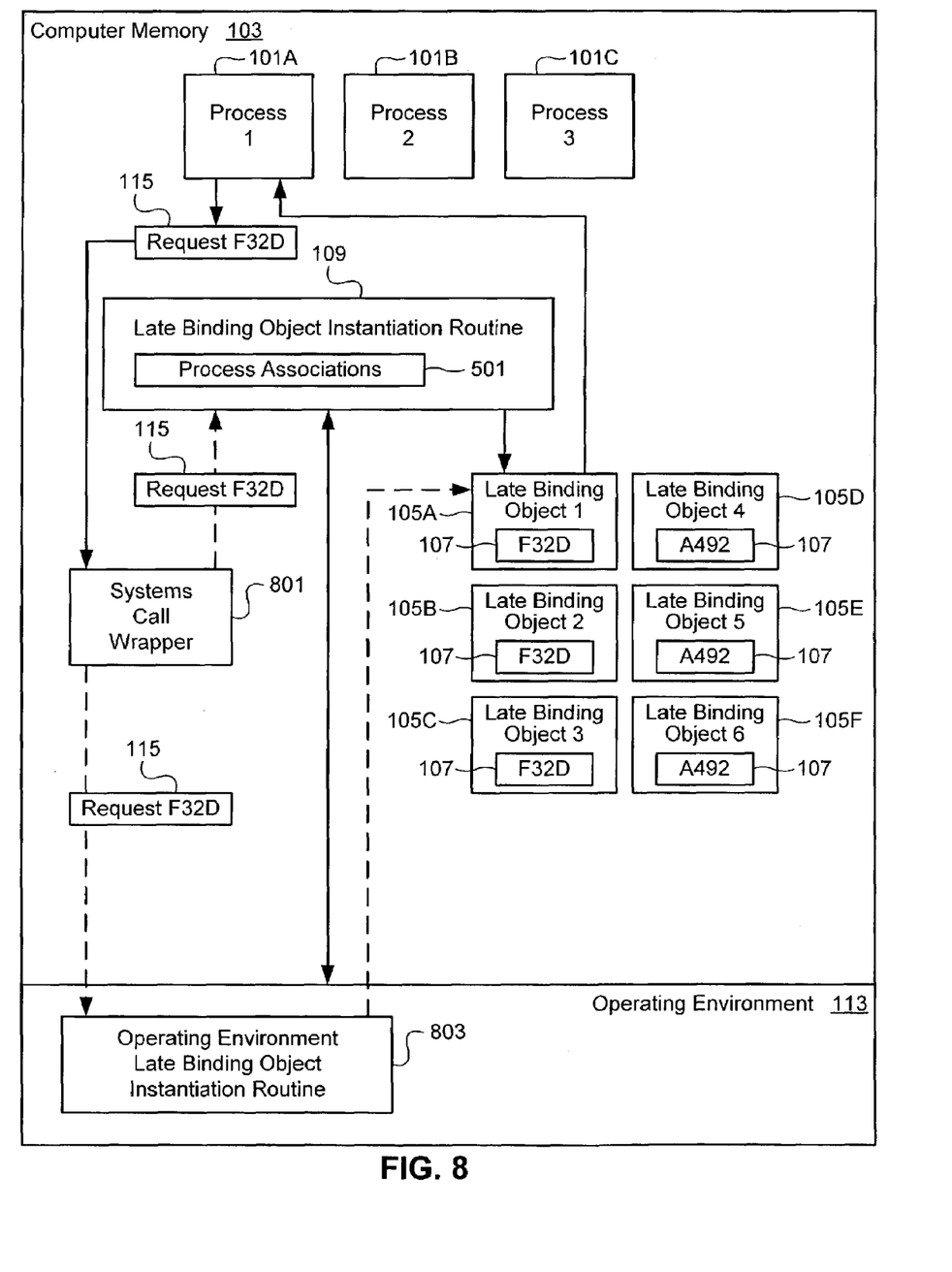
FIG. 8 is a block diagram, illustrating an overview of another embodiment of the present invention, in which requests to access late binding objects are processed by a system call wrapper.

FIG. 8 illustrates another embodiment of the present invention, in which requests 115 to access late binding objects 105 by their identifiers 107 are processed by a system call wrapper 801. As explained above, in the prior art, processes 101 would call the operating environment 113 to access late binding objects 105. In the illustrated embodiment of the present invention, techniques known to those of ordinary skill in the relevant art are used in order to intercept such requests 115, and pass them to a system call wrapper 801, which is executed instead of the operating environment routine 803 for instantiating late binding objects 105. The system call wrapper 801 determines whether the intercepted call is one for which multiple late binding objects 105 with the same identifier 107 are supported (e.g., was the call made by a supported process 101 and/or for a supported identifier 107). If so, the system call wrapper 801 calls the late binding object instantiation routine 109, and passes it 109 the request 115. The late binding object instantiation routine 109 proceeds to process the request 115 as described above.

If the intercepted call is not one for which multiple late binding objects 105 with the same identifier 107 are supported, the system call wrapper calls the operating environment routine 803 for instantiating late binding objects 105, and passes the request 115 to it, for processing.

Figure 9:
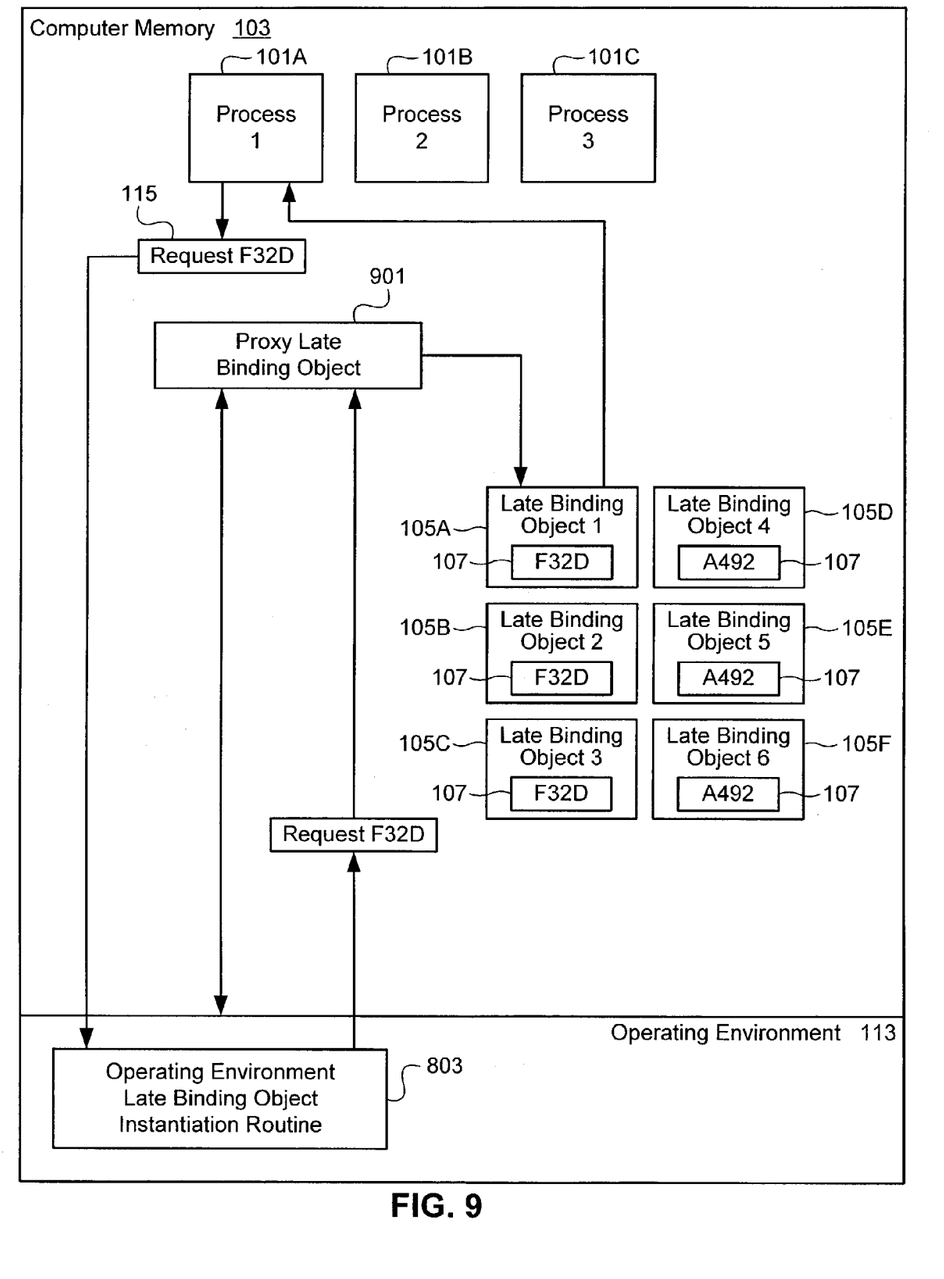
FIG. 9 is a block diagram, illustrating an overview of another embodiment of the present invention, in which requests to access late binding objects are processed by a proxy late binding object.

FIG. 9 illustrates another embodiment of the present invention, in which requests 115 to access late binding objects 105 by their identifiers 107 are processed by a proxy late binding object 901. In this embodiment, a single, proxy late binding object 901 is registered with the operating environment 113 as being associated with each identifier 107 for which multiple late binding objects 105 with the same identifier 107 are supported. Thus, whenever a process 101 attempts to access a supported late binding object 105 by its identifier, the operating environment routine 803 for instantiating late binding objects 105 routes the request 115 to the proxy late binding object 901.

In the embodiment illustrated in FIG. 9, the functionality described above as being performed by the late binding object instantiation routine 109 is instead performed by the proxy late binding object 901. In other words, the proxy late binding object 901 can determine which process 101 attempted to access the late binding object 105, determine which late binding object 105 is associated with the process 101, and make the associated late binding object 105 available to the process 101, using the techniques of any of the various embodiments described above in relation to the late binding object instantiation routine 109.

Figure 10:
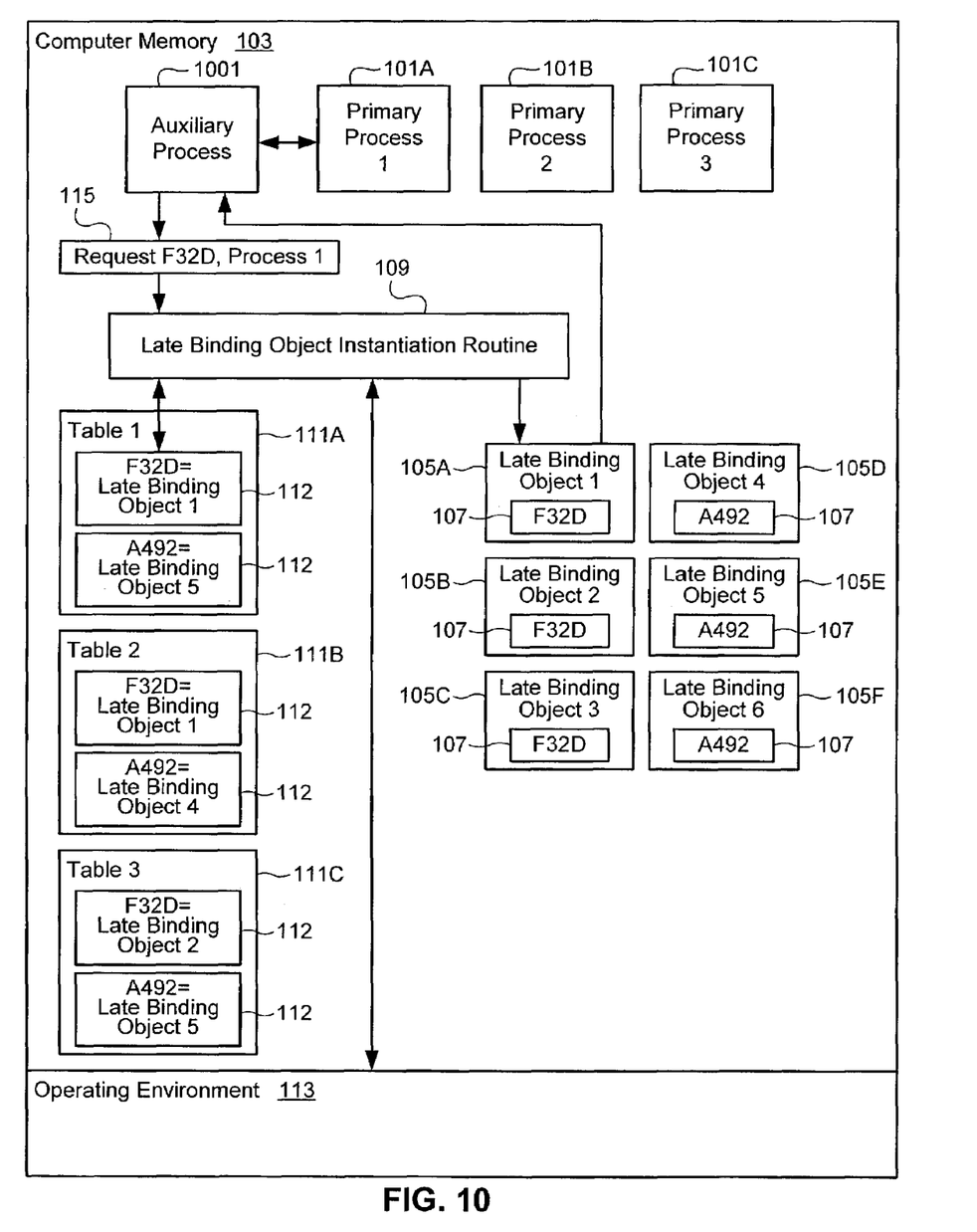
FIG. 10 is a block diagram, illustrating an overview of another embodiment of the present invention, in which requests to access late binding objects are made by an auxiliary process.

FIG. 10 illustrates another embodiment of the present invention, in which an auxiliary process 1001 requests to access a late binding object 105. In this embodiment, the processes 101 that are associated with the late binding objects 105 can be thought of as primary processes 101. An auxiliary process 1001 is associated with one of the primary processes 101, such that it needs to access the late binding objects 105 that are associated with that primary process 101. The auxiliary process 1001 illustrated in FIG. 10 is associated with Primary Process 1. It is to be understood that an auxiliary process 1001 need not be a child of its primary process 101. In fact, the associated primary process 101 need not be executing at all when the auxiliary process 1001 attempts the late binding object 105 access.

The auxiliary process 1001 attempts to access a late binding object 105 by its identifier 107 and an identification of the associated primary process 101. It is to be understood that many possibilities for identifying the associated primary process 101 exist, for example a relative reference, the full path or the process id. The late binding object 105 with the requested identifier 107 that is associated with the indicated primary process 101 is then identified and made available using any of the above described embodiments of the present invention. It is to be understood that the appropriate late binding object 105 is made available to the auxiliary process 1001. Although FIG. 10 illustrates a late binding object instantiation routine 109 external to the operating environment 113 and separate tables 111 for each process 101, any of the other embodiments described above can also be used for identifying and instantiating the appropriate late binding object 105.

As will be understood by those familiar with the art, the invention may be embodied in other specific forms without departing from the spirit or essential characteristics thereof. Likewise, the particular naming and division of the modules, routines, features, attributes, methodologies and other aspects are not mandatory or significant, and the mechanisms that implement the invention or its features may have different names, divisions and/or formats. Furthermore, as will be apparent to one of ordinary skill in the relevant art, the modules, routines, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating environment. Accordingly, the disclosure of the present invention is intended to be illustrative, but not limiting, of the scope of the invention, which is set forth in the following claims.

What is claimed is:

1. In an operating environment that only supports a single late binding object with a same identifier, a computer implemented method for supporting multiple late binding objects with the same identifier, the method comprising:

associating each of a plurality of processes with one of a plurality of late binding objects, such that at least two of the processes are each associated with separate late binding objects having the same identifier;

responsive to one of the processes attempting to access a late binding object by its identifier, determining which late binding object is associated with the process; and making the associated late binding object available to the process;

wherein associating each of a plurality of processes with one of a plurality of late binding objects having a same identifier further comprises creating a separate object table for each process, each object table containing at least an identifier and a location of each late binding associated with the process.

2. The method of claim 1 further comprising:

executing a late binding object instantiation routine that is not a component of the operating environment;

determining, by the late binding object instantiation routine, which process attempted to access the late binding object;

determining, by the late binding object instantiation routine, which late binding object is associated with the process; and making the associated late binding object available to the process by the late binding object instantiation routine.

3. The method of claim 1, further comprising:

intercepting a call to a late binding object instantiation routine that is a component of the operating environment, the call being a request by a process to access a late binding object by its identifier;

responsive to intercepting the call, executing a system call wrapper; and determining, by the system call wrapper, whether the intercepted call is one for which multiple late binding objects with the same identifier are supported.

4. The method of claim 3 further comprising:

responsive to determining that the intercepted call is one for which multiple late binding objects with the same identifier are supported, performing the operations of:

executing a late binding object instantiation routine that is not a component of the operating environment;

determining, by the late binding object instantiation routine, which process attempted to access the late binding object;

determining, by the late binding object instantiation routine, which late binding object is associated with the process; and making the associated late binding object available to the process by the late binding object instantiation routine.

5. The method of claim 3 further comprising:

responsive to determining that the intercepted call is one for which multiple late binding objects with the same identifier are not supported, returning control to the intercepted operating environment late binding object instantiation routine.

6. The method of claim 1, further comprising:

registering a proxy late binding object with the operating environment, such that a process attempting to access a late binding object by its identifier calls the proxy late binding object;

determining, by the proxy late binding object, which process attempted to access the late binding object;

determining, by the proxy late binding object, which late binding object is associated with the process; and making the associated late binding object available to the process by the proxy late binding object.

7. The method of claim 1, wherein associating each of a plurality of processes with one of a plurality of late binding objects having a same identifier further comprises:

creating a global object table containing, for each process of the plurality, at least an identifier and location of each late binding object associated with the process.

8. The method of claims 1, 2, 4 or 6 wherein making the associated late binding available to the process further comprises:

executing a protocol used by the operating environment in order to access the late binding object.

9. The method of claim 8, further comprising:

loading a dynamic link library in which the late binding object resides; and using a published entry point to negotiate instantiation of the late binding object.

10. The method of claim 1, 2, 4 or 6 wherein determining which late binding object is associated with the process further comprises:

accessing an object table associated with the process, the object table containing at least an identifier and location of each late binding object associated with the process.

11. The method of claim 1, 2, 4 or 6 wherein determining which late binding object is associated with the process further comprises:

accessing a global object table containing, for each process of the plurality, at least an identifier and location of each late binding object associated with the process.

12. The method of claim 2 or 4 wherein associating each of a plurality of processes with one of a plurality of late binding objects having a same identifier further comprises:

maintaining, by the late binding object instantiation routine, for each process of the plurality, at least an identifier and location of each late binding object associated with the process.

13. The method of claim 2, 4 or 6 wherein determining which process attempted to access the late binding object further comprises:

utilizing operating system services to determine which process is active.

14. The method of claim 1 or 7 wherein the location of each late binding object associated with the process further comprises:

a relative reference from the process to a dynamic link library in which the late binding object resides.

15. A computer program product for supporting multiple late binding objects with a same identifier in an operating environment that only supports a single late binding object with the same identifier, the computer program product comprising:

program code for associating each of a plurality of processes with one of a plurality of late binding objects, such that at least two of the processes are each associated with separate late binding objects having the same identifier;

program code for determining which late binding object is associated with a process, responsive to one of the processes attempting to access a late binding object by its identifier;

program code for making the associated late binding object available to the process;

program code for creating a separate object table for each process, each object table containing at least an identifier and a location of each late binding associated with the process; and a computer readable medium on which the program codes are stored.

16. The computer program product of claim 15 further comprising:
program code comprising a late binding object instantiation routine that is not a component of the operating environment, comprising the program code for determining which late binding object is associated with the process responsive to one of the processes attempting to access a late binding object by its identifier, the program code for making the associated late binding object available to the process, and program code for determining which process attempted to access the late binding object; and
program code for executing the late binding object instantiation routine.

17. The computer program product of claim 15 further comprising:
program code for intercepting a call to a late binding object instantiation routine that is a component of the operating environment, the call being a request by a process to access a late binding object by its identifier;
program code for executing a system call wrapper, responsive to intercepting the call; and
program code comprising a system call wrapper, comprising program code for determining whether the intercepted call is one for which multiple late binding objects with the same identifier are supported.

18. The computer program product of claim 17 wherein the program code comprising the system call wrapper further comprises:
program code for, responsive to determining that the intercepted call is one for which multiple late binding objects with the same identifier are supported, executing a late binding object instantiation routine that is not a component of the operating environment; and wherein the computer program product further comprises:
program code comprising the late binding object instantiation routine that is not a component of the operating environment, comprising the program code for determining which late binding object is associated with the process responsive to one of the processes attempting to access a late binding object by its identifier, the program code for making the associated late binding object available to the process, and program code for determining which process attempted to access the late binding object.

19. The computer program product of claim 17 wherein the program code comprising the system call wrapper further comprises:
program code for, responsive to determining that the intercepted call is one for which multiple late binding objects with the same identifier are not supported, returning control to the intercepted operating environment late binding object instantiation routine.

20. The computer program product of claim 15, further comprising:
program code for registering a proxy late binding object with the operating environment, such that a process attempting to access a late binding object by its identifier calls the proxy late binding object; and
program code comprising the proxy late binding object, comprising the program code for determining which late binding object is associated with the process responsive to one of the processes attempting to access a late binding object by its identifier, the program code for making the associated late binding object available to the process, and program code for determining which process attempted to access the late binding object.

21. The computer program product of claim 15, further comprising:
program code for creating a global object table containing, for each process of the plurality, at least an identifier and location of each late binding object associated with the process.

22. A computer system for supporting multiple late binding objects with a same identifier in an operating environment that only supports a single late binding object with the same identifier, the computer system having a memory comprising:
a software portion for associating each of a plurality of processes with one of a plurality of late binding objects, such that at least two of the processes are each associated with separate late binding objects having the same identifier;
a software portion for determining which late binding object is associated with a process, responsive to one of the processes attempting to access a late binding object by its identifier;
a software portion for creating a separate object table for each process, each object table containing at least an identifier and a location of each late binding associated with the process; and
a software portion for making the associated late binding object available to the process.

23. The computer system of claim 22 further comprising:
a software portion comprising a late binding object instantiation routine that is not a component of the operating environment, comprising the software portion for determining which late binding object is associated with the process responsive to one of the processes attempting to access a late binding object by its identifier, the software portion for making the associated late binding object available to the process, and a software portion for determining which process attempted to access the late binding object; and
a software portion for executing the late binding object instantiation routine.

24. The computer system of claim 22 further comprising:
a software portion for intercepting a call to a late binding object instantiation routine that is a component of the operating environment, the call being a request by a process to access a late binding object by its identifier;
a software portion for executing a system call wrapper, responsive to intercepting the call; and
a software portion comprising a system call wrapper, comprising a software portion for determining whether the intercepted call is one for which multiple late binding objects with the same identifier are supported.

25. The computer system of claim 24 wherein the software portion comprising the system call wrapper further comprises:
a software portion for, responsive to determining that the intercepted call is one for which multiple late binding objects with the same identifier are supported, executing a late binding object instantiation routine that is not a component of the operating environment; and wherein the computer system further comprises:
a software portion comprising the late binding object instantiation routine that is not a component of the operating environment, comprising the software portion for determining which late binding object is associated with the process responsive to one of the processes attempting to access a late binding object by its identifier, the software portion for making the associated late binding object available to the process, and a software portion for determining which process attempted to access the late binding object.

26. The computer system of claim 24 wherein the software portion comprising the system call wrapper further comprises:
a software portion for, responsive to determining that the intercepted call is one for which multiple late binding objects with the same identifier are not supported, returning control to the intercepted operating environment late binding object instantiation routine.

27. The computer system of claim 22, further comprising:
a software portion for registering a proxy late binding object with the operating environment, such that a process attempting to access a late binding object by its identifier calls the proxy late binding object; and
a software portion comprising the proxy late binding object, comprising the software portion for determining which late binding object is associated with the process responsive to one of the processes attempting to access a late binding object by its identifier, the software portion for making the associated late binding object available to the process, and a software portion for determining which process attempted to access the late binding object.

28. The computer system of claim 22, further comprising:
a software portion for creating a global object table containing, for each process of the plurality, at least an identifier and location of each late binding object associated with the process.

29. In an operating environment that only supports a single late binding object with a same identifier, a computer implemented method for supporting multiple late binding objects with the same identifier, the method comprising:
associating each of a plurality of primary processes with one of a plurality of late binding objects, such that at least two of the primary processes are each associated with separate late binding objects having the same identifier;
responsive to an auxiliary process, associated with one of the primary processes, attempting to access a late binding object by its identifier and an indication of its associated primary process, determining which late binding object is associated with the primary process; and
making the late binding object associated with the primary process available to the auxiliary process;
wherein associating each of a plurality of primary processes with one of a plurality of late binding objects further comprises creating a separate object table for each primary process, each object table containing at least an identifier and a location of each late binding associated with the primary process.

\* \* \* \* \*